(12) United States Patent
Tan (10) Patent No.: US 8,724,575 B2
(45) Date of Patent: May 13, 2014

(54) METHOD AND DEVICE FOR ALLOCATING CONTROL CHANNEL ELEMENT RESOURCES

(75) Inventor: Yuanchun Tan, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 78 days.

(21) Appl. No.: 13/509,904

(22) PCT Filed: Apr. 8, 2010

(86) PCT No.: PCT/CN2010/071624
§ 371 (c)(1),
(2), (4) Date: May 16, 2012

(87) PCT Pub. No.: WO2010/148702
PCT Pub. Date: Dec. 29, 2010

(65) Prior Publication Data
US 2012/0218969 A1    Aug. 30, 2012

(30) Foreign Application Priority Data
Nov. 16, 2009  (CN) .......................... 2009 1 0223605

(51) Int. Cl.
*H04W 72/04* (2009.01)

(52) U.S. Cl.
USPC ............ 370/329; 370/439; 455/450; 455/509

(58) Field of Classification Search
USPC .................................. 370/328, 326; 455/434
See application file for complete search history.

(56) References Cited

U.S. PATENT DOCUMENTS

| 8,165,085 | B2 | 4/2012 | Nishio et al. | |
|---|---|---|---|---|
| 2010/0279628 | A1* | 11/2010 | Love et al. | 455/70 |
| 2010/0290418 | A1* | 11/2010 | Nishio et al. | 370/329 |
| 2011/0201333 | A1* | 8/2011 | Kwon et al. | 455/434 |
| 2011/0286413 | A1* | 11/2011 | Nishio et al. | 370/329 |
| 2012/0236813 | A1* | 9/2012 | Tan | 370/329 |

FOREIGN PATENT DOCUMENTS

| CN | 101389106 A1 | 3/2009 |
|---|---|---|
| WO | 2009057283 A1 | 5/2009 |
| WO | 2009087742 A1 | 7/2009 |

OTHER PUBLICATIONS

3GPP TSG RAN WG1 Meeting #52bis, "PDCCH Allocation Based on Hashing Function Generation Method for PDCCH Blind Decoding", Mar. 31, 2008, Shenzhen, China.
3GPP TSG-RAN Meeting #54bis, "Changes for DCI format 1A and 1C for broadcast control and update of DCI formats", Sep. 29, 2008, Prague, Czech Republic.
3GPP TSG RAN WG1 #49, "CCE to RE mapping", May 7, 2007, Kobe, Japan.

* cited by examiner

*Primary Examiner* — Anh-Vu Ly
*Assistant Examiner* — Hashim Bhatti
(74) *Attorney, Agent, or Firm* — Christopher L. Parmelee; Walker & Jocke (57) ABSTRACT

The present invention discloses a method and a device for allocating a Control Channel Element (CCE) resource. The method includes: a network allocates the CCE resource according to the CCE aggregation level and the current use information of the CCE resource. Through the present invention, the problem of resource waste in the allocation of idle CCE resource in the related art is solved, thereby achieving the effect of effectively using the idle CCE resource.

11 Claims, 7 Drawing Sheets

Calculate the Control Channel Element (CCE) aggregation level Lcom available to the public Downlink Control Information (DCI) — S102

Use the CCE aggregation level Lcom for the allocation of the CCE — S104

METHOD AND DEVICE FOR ALLOCATING CONTROL CHANNEL ELEMENT RESOURCES

FIELD OF THE INVENTION

The present invention relates to the communication field, and in particular to a method and a device for allocating a Control Channel Element (CCE) resource.

BACKGROUND OF THE INVENTION

The Long-Term Evolution (LTE) is a communication technology. The Physical Downlink Control Channel (PDCCH, High Speed Physical Downlink Control Channel) is composed of a CCE and is used for bearing Downlink Control Information (DCI). The CCE is divided into public space CCE (hereinafter referred to as a public CCE) and dedicated space CCE (hereinafter referred to as a dedicated CCE), wherein the public CCE includes $0^{th}$-$15^{th}$ CCEs and the rest is dedicated CCE. The document of the 3rd Generation Partnership Project (3GPP), TS36.213.8.7.0, stipulates that: the DCI needing the public CCE can only adopt the CCE aggregation level L of 4 or 8, wherein when the CCE aggregation level L is 4, the start position of the CCE is respectively at the $0^{th}$, $4^{th}$, $8^{th}$ or $12^{th}$ CCE, and when the CCE aggregation level L is 8, the start position of the CCE is respectively at the $0^{th}$ or $8^{th}$ CCE; and for the DCI needing the dedicated CCE, the CCE occupied by and allocated to the DCI is determined by a Hash function which is related to subframe number, CCE sum (the number of CCEs), CCE aggregation level L, number of PDCCH candidates $M^{(L)}$ and the Radio Network Temporary Identity (RNTI) of a User Equipment (UE). According to the document of 3GPP TS36.212.8.7.0, the DCI includes the DCI of the format 0, format 1, format 1A, format 1B, format 1C, format 1D, format 2, format 2A, format 3 and format 3A, wherein the DCI of the format 0 (hereinafter referred to as DCI0) is used for UE uplink authorization; and the DCI of the format 1, format 1A, format 1B, format 1C, format 1D, format 2 and format 2A (hereinafter referred to as DCIx) is used for UE downlink allocation.

Only the dedicated CCE resource can be allocated to the DCI of the format 1, format 1B, format 1D, format 2 and format 2A; only the public CCE resource can be allocated to the DCI of the format 10, format 3 and format 3A; and either public CCE resource or dedicated CCE resource may be allocated to the DCI of the format 0 and format 1A. The DCI needing the public CCE resource allocated is called public DCI.

A Media Access Control (MAC) layer needs to allocate the CCE resource according to certain modes.

At present, the technology related to the allocation of the CCE resource includes: judging the CCE aggregation level L used by the public DCI and the DCI of the UE according to the wideband Channel Quality Identity (CQI) and Reference Signal Receiving Power (RSRP) information reported by the UE, or determining the CCE aggregation level L used by the UE according to the quantity of DCIx and DCI0 to be scheduled and the CCE resource. Generally, the public CCE is allocated to the public DCI by finding the public CCE resource with the minimum sequential number in the idle public CCEs. For example, a public DCI needs 4 CCE resource at the current Transmission Time Interval (TTI), and meanwhile the public CCE resource ($CCE_0$-$CCE_3$) in the public CCE resource ($CCE_0$-$CCE_{15}$) have been occupied. According to the above method, the public CCE resource ($CCE_4$-$CCE_7$) will be allocated to the public DCI. Similarly, the dedicated CCE is allocated to the DCI of the UE by finding the idle dedicated CCE resource with the minimum sequential number in the number of PDCCH candidates $M^{(L)}$. For example, the DCI of a UE needs 1 CCE resource at the current TTI, it is assumed that the CCEs corresponding to the number of PDCCH candidates $M^{(L)}$ of the UE are respectively $CCE_4$-$CCE_9$, and that $CCE_5$ has been occupied. According to the above method, $CCE_4$ will be allocated to the DCI of the UE. Therefore, the allocation of idle CCE resource in the related art may have the following problems: when CCE resource is allocated to multiple DCIs, it is possible that some DCIs are not allocated with CCE when there is idle CCE resource existing, causing waste of resource.

SUMMARY OF THE INVENTION

The present invention is provided to solve the problem of resource waste in the allocation of idle CCE resource in the related art. Therefore, the main objective of the present invention is to provide a solution for allocating a CCE resource, to solve at least one of the problems.

In order to achieve the objective, in one aspect, the present invention provides a method for allocating CCE resource.

The method for allocating the CCE resource includes that: a network side allocates the CCE resource according to the CCE aggregation level and the current use information of the CCE resource.

Preferably, the step that the network side allocates the CCE resource according to the CCE aggregation level and the current use information of the CCE resource includes that: the network side determines the CCE resource to be selected by the public DCI according to the CCE aggregation level corresponding to the public DCI; and the network side determines a block of CCE resource from the CCE resource to be selected by the public DCI to allocate to the public DCI according to the current use information of the CCE resource.

Preferably, the step that the network side determines a block of CCE resource from the CCE resource to be selected by the public DCI to allocate to the public DCI according to the current use information of the CCE resource includes that: the network side judges whether some of the CCE resource to be selected by the public DCI is located in the boundary CCE; and if yes, the network side allocates the CCE resource in the boundary CCE to the public DCI; if not, the network side determines a block of CCE resource from the CCE resource to be selected by the public DCI to allocate to the public DCI according to an uniformity rule.

Preferably, the step that the network side allocates the CCE resource according to the CCE aggregation level and the current use information of the CCE resource includes that: the network side determines the CCE resource to be selected by the DCI of the UE according to the CCE aggregation level corresponding to the DCI of the UE; and the network side determines a block of CCE resource from the CCE resource to be selected by the DCI of the UE according to an uniformity rule to allocate to the DCI of the UE.

Preferably, when the network side determines multiple blocks of CCE resource from the CCE resource to be selected by the DCI of the UE to allocate to the DCI of the UE according to the uniformity rule, the method further includes that: the network side selects a block of CCE resource which fully occupies a CCE aggregation level greater than the current CCE aggregation level from the multiple blocks of CCE resource to allocate to the DCI of the UE.

Preferably, the step that the network side selects a block of CCE resource which fully occupies a CCE aggregation level greater than the current CCE aggregation level from the multiple blocks of CCE resource to allocate to the DCI of the UE includes that: Step 1, the network side selects a CCE aggregation level from the CCE aggregation levels greater than the current CCE aggregation level in an ascending order; and Step 2, the network side judges whether there are more than a block of CCE resource fully occupying the selected CCE aggregation level in the multiple blocks of CCE resource, and if not, the block of CCE resource is allocated to the DCI of the UE, otherwise, Step 1 is executed.

Preferably, before the network side determines a block of CCE resource from the CCE resource to be selected by the DCI of the UE to allocate to the DCI of the UE according to the uniformity rule, the method further includes that: it is judged that the number of PDCCH candidates corresponding to the corresponding CCE aggregation level is greater than a predetermined threshold.

In order to achieve the objective, in another aspect, the present invention provides a device for allocating a CCE resource.

The device for allocating the CCE resource includes: an allocation module which is used for allocating the CCE resource according to the CCE aggregation level and the current use information of the CCE resource.

Preferably, the allocation module includes: a first determination sub-module which is used for determining the CCE resource to be selected by the public DCI according to the CCE aggregation level corresponding to the public DCI, and a second determination sub-module which is used for determining a block of CCE resource from the CCE resource to be selected by the public DCI to allocate to the public DCI according to the current use information of the CCE resource.

Preferably, the second determination sub-module includes: a judging unit which is used for judging whether some of the CCE resource to be selected by the public DCI is located in the boundary CCE, a first allocation unit which is used for allocating the CCE resource in the boundary CCE to the public DCI, if the judging result of the judging unit is yes, and a second allocation unit which is used for determining a block of CCE resource from the CCE resource to be selected by the public DCI to allocate to the public DCI according to the uniformity rule, if the judging result of the judging unit is no.

Preferably, the allocation module includes: a third determination sub-module which is used for determining the CCE resource to be selected by the DCI of the UE according to the CCE aggregation level corresponding to the DCI of the UE, and a fourth determination sub-module which is used for determining a block of CCE resource from the CCE resource to be selected by the DCI of the UE to allocate to the DCI of the UE according to the uniformity rule.

Preferably, when the fourth determination sub-module determines that multiple blocks of CCE resource are allocated to the DCI of the UE, the device further includes: a selecting sub-module which is used for selecting a block of CCE resource which fully occupies a CCE aggregation level greater than the current CCE aggregation level from the multiple blocks of CCE resource to allocate to the DCI of the UE.

Through the present invention, the CCE resource is allocated according to the CCE aggregation level and the current use information of the CCE resource, the problem of resource waste in the allocation of idle CCE resource in the related art is solved, so as to achieve the effect of effectively using the idle CCE resource.

BRIEF DESCRIPTION OF THE DRAWINGS

The drawings herein are used for providing a further understanding of the present invention and constituting one part of this application. The schematic embodiments of the present invention and description thereof are used for the explanation of the present invention and not limiting the present invention. In the drawings.

DETAILED DESCRIPTION OF THE EMBODIMENTS

In consideration of the problem of resource waste in the allocation of idle CCE resource in the related art, the present invention provides a solution for allocating a CCE resource, in which the CCE resource is allocated according to the CCE aggregation level and the current use information of the CCE resource. It solves the problem of resource waste in the allocation of idle CCE resource in the related art. Compared with the conventional technology for allocating the CCE resource, the solution further improves the utilization rate of the CCE resource.

The present invention will be described below with reference to the drawings and in conjunction with the embodiments in detail. It should be noted that, in the case of no conflict, the embodiments of the present invention and feature therein can be combined with each other.

Method Embodiment

According to the embodiment of the present invention, a method for allocating the CCE resource is provided, including that: the network side allocates the CCE resource according to the CCE aggregation level and the current use information of the CCE resource.

In the embodiment, besides the CCE aggregation level, the current use information of the CCE resource is introduced for the allocation of the CCE resource, so as to allocate the idle CCE resource to the DCI needing the CCE resource when there is the idle CCE resource, thereby avoiding resource waste and achieving the effect of effectively using the idle CCE resource.

The step that the network side allocates the CCE resource includes that: the network side allocates the CCE resource to the public DCI and to the DCI of the UE, which is described below in detail.

Public DCI

For each public DCI, one public DCI is sequentially extracted from the public DCI scheduling queue at the current time TTI. That the network side allocates the CCE resource according to the CCE aggregation level and the current use information of the CCE resource includes that: the network side determines the CCE resource to be selected by the public DCI according to the CCE aggregation level corresponding to the public DCI (the size of each block of CCE resource is the CCE aggregation level used by the public DCI); and then, the network side determines a block of CCE resource from the CCE resource to be selected by the public DCI to allocate to the public DCI according to the current use information of the CCE resource. The current use information of the CCE resource may include: the current distribution condition and current location of the idle CCE resource.

In this embodiment, the range of the CCE resource to be selected by the public DCI is determined by the CCE aggregation level. The CCE resource allocated to the public DCI is determined by the current use information of the CCE resource, so as to effectively allocate the idle CCE resource to the public DCI.

That the network side determines a block of CCE resource from the CCE resource to be selected by the public DCI to allocate to the public DCI according to the current use information of the CCE resource includes that: the network side judges whether some of the CCE resource to be selected by the public DCI is located in the boundary CCE; and if yes, the network side allocates the CCE resource in the boundary CCE to the public DCI; otherwise, the network side determines one block of CCE resource from one or more blocks of CCE resource to allocate to the public DCI according to the uniformity rule.

The boundary CCE includes head boundary CCE and tail boundary CCE, which are specifically defined as follows:

it is assumed that there are resource of CCEs in the number of N totally at the current TTI in the whole cell, which are sequentially represented by $CCE_0$-$CCE_{N-1}$, the head boundary CCE is $CCE_0$, the tail boundary CCE is $CCE_T$, wherein T is calculated by the formula (1.1):

$$T = \left\lfloor \frac{N}{L} \right\rfloor * L + L - 1, \quad (1.1)$$

in which, $\lfloor \ \rfloor$ is the operation of rounding down, and L is the CCE aggregation level L.

The uniformity rule refers to that the network side evenly allocates the used CCE resource in the whole CCE area.

In this embodiment, if there is an idle boundary CCE, the boundary CCE is allocated to the public DCI. If there is no idle boundary CCE, the CCE is allocated to the public DCI according to the uniformity rule, in order that the CCE resource allocated to the DCI can be evenly distributed over the whole CCE area.

That the network side determines a block of CCE resource from the CCE resource to be selected by the public DCI to allocate to the public DCI according to the current use information of the CCE resource includes that: the network side determines one block of CCE resource from one or more blocks of CCE resource to allocate to the public DCI according to the uniformity rule.

In this embodiment, the CCE is allocated to the public DCI according to the uniformity rule, in order that the CCE resource allocated to the DCI can be evenly distributed over the whole CCE area.

the DCI of the UE

For the DCI of each UE, the DCI of one UE is sequentially selected from the UE scheduling queue at the current TTI. That the network side allocates the CCE resource according to the CCE aggregation level and the current use information of the CCE resource includes that: the network side determines the CCE resource to be selected by the DCI of the UE according to the CCE aggregation level corresponding to the DCI of the UE (the size of each block of CCE resource is the CCE aggregation level used by the DCI of the UE); and then, the network side determines a block of CCE resource from the CCE resource to be selected by the DCI of the UE to allocate to the DCI of the UE according to the uniformity rule.

In this embodiment, the range of the CCE resource to be selected by the DCI of the UE is determined by the CCE aggregation level. The CCE resource allocated to the DCI of the UE is determined by the current use information of the CCE resource, so as to effectively allocate the idle CCE resource to the DCI of the UE. The uniformity rule refers to that the network side has the used CCE resource evenly distributed over the whole CCE area. Specifically:

when the network side determines multiple blocks of CCE resource from the CCE resource to be selected by the DCI of the UE to allocate to the DCI of the UE according to the uniformity rule, the network side selects from the multiple blocks of CCE resource a block of CCE resource which fully occupies a CCE aggregation level greater than the current CCE aggregation level to allocate to the DCI of the UE. For example, if the network side determines the multiple blocks of CCE resource to be selected by the DCI of the UE according to the current CCE aggregation level of 2, the network side selects from the multiple blocks of CCE resource the CCE resource which can fully occupy the aggregation level of 4 or both 4 and 8 in the surrounding area to allocate to the DCI of the UE.

In this embodiment, the CCE is allocated to the DCI of the UE according to the uniformity rule, so that the CCE resource allocated to the DCI can be evenly distributed over the whole CCE area.

In this case, that the network side selects from the multiple blocks of CCE resource a block of CCE resource which fully occupies a CCE aggregation level greater than the current CCE aggregation level to allocate to the DCI of the UE includes the following steps: Step 1: the network side selects a CCE aggregation level from the CCE aggregation levels greater than the current CCE aggregation level in an ascending order wherein for example, when the current CCE aggregation level is 2, the aggregation level is selected from the aggregation level set {4, 8} in an ascending order; and Step 2, the network side judges whether there are more than one block of CCE resource fully occupying the selected CCE aggregation level in the multiple blocks of CCE resource, and if not, the CCE resource is allocated to the DCI of the UE, otherwise, Step 1 is executed. For example, when the current CCE aggregation level is 2, the aggregation level is selected from the aggregation level set {4, 8} in an ascending order, and if there are multiple blocks of CCE resource capable of fully occupying the aggregation level of 4 in the multiple blocks of CCE resource, it is further judged whether the number of blocks of CCE resource capable of fully occupying the aggregation level of 8 is one.

In this embodiment, the CCE aggregation level greater than the current CCE aggregation level is sequentially selected in an ascending order, till the number of the blocks of CCE resource meeting the allocation condition in the selected CCE aggregation level is 1, so that the CCE resource meeting the condition and having the minimal aggregation level can be selected.

During allocating the CCE resource to the DCI of the UE, before the network side determines a block of CCE resource from the multiple blocks of CCE resource to be selected by the DCI of the UE to allocate to the DCI of the UE according to the uniformity rule, it is judged that the number of PDCCH candidates corresponding to the corresponding CCE aggregation level is greater than a predetermined threshold.

In this embodiment, the number of PDCCH candidates is greater than the predetermined threshold, so that the CCE resource to be allocated can meet the allocation requirement.

That the network side allocates the CCE resource according to the CCE aggregation level includes that: the network side extracts the DCI of a UE from the UE scheduling queue at the current TTI, selects a CCE aggregation level from the CCE aggregation level set corresponding to the DCI of the UE, and allocates the CCE resource to the DCI of the UE by the selected CCE aggregation level.

The principle of allocating the CCE resource in the PDCCH candidate area is: determining the CCE resource used for the DCI of the UE according to the CCE aggregation level, the location of the PDCCH candidate area, the quantity of the CCE resource allocable in the PDCCH candidate area, the use condition of the CCE resource, the residual CCE resource and other information.

The implementations of the embodiments of the present invention will be described below in conjunction with examples in detail.

For the public space CCE, the position information of the public space CCE needed in the allocation is generally obtained by the CCE aggregation level L of 4 or 8. When the CCE aggregation level L is 4, the start position information of the CCE is 0, 4, 8 or 12; and when the CCE aggregation level L is 8, the start position information of the CCE is 0 or 8. In the embodiment of the present invention, the position information of the public space CCE is obtained by the aggregation level of 4. Table 1 shows the corresponding relationship between the referential CCE aggregation level and number of PDCCH candidates in the process of obtaining the position information of the public space CCE.

TABLE 1

| Type | CCE aggregation level | Number of PDCCH candidates |
|---|---|---|
| Public space | 4 | 4 |
| | 8 | 2 |

As for the dedicated space CCE, the corresponding relationship between, number of PDCCH candidates and CCE aggregation level is as shown in Table 2:

TABLE 2

| Type | CCE aggregation level | Number of PDCCH candidates |
|---|---|---|
| Dedicated space | 1 | 6 |
| | 2 | 6 |
| | 4 | 2 |
| | 8 | 2 |

First Example

Figure 1:
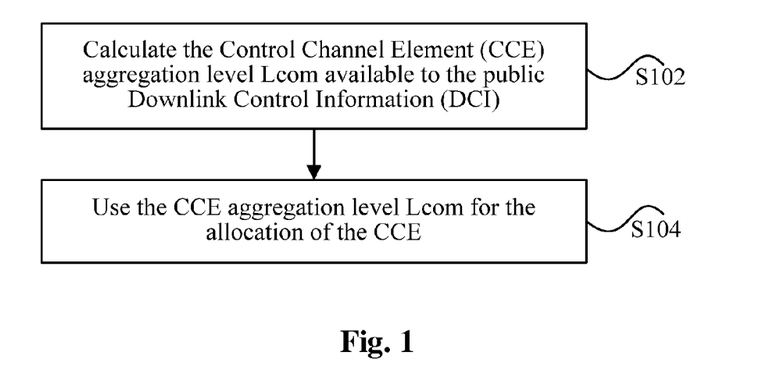
FIG. 1 is a flowchart of a method for allocating a CCE resource according to the first example of an embodiment of the present invention.
Figure 2:
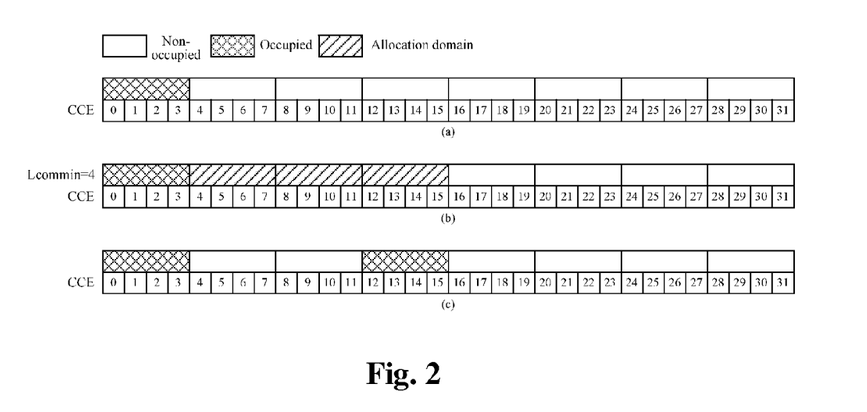
FIG. 2 is a diagram showing the allocation of a CCE resource with the CCE aggregation level of 4 to a public DCI according to the embodiment of the present invention.

In a TTI, the CCE is allocated to a public DCI. It is assumed that the CCE resource of the cell in the TTI is $CCE_0$-$CCE_{31}$, wherein the CCE resource $CCE_0$-$CCE_3$ has been occupied. FIG. 1 is a flowchart of a method for allocating a CCE resource according to the first example of embodiment of the present invention; and FIG. 2 is a diagram showing the allocation of a CCE resource with the CCE aggregation level of 4 to a public DCI according to the embodiment of the present invention. As shown in FIG. 1, the method includes S102 to S104.

S102: The CCE aggregation level Lcom which can be used by the public DCI is calculated by the conventional art. For example, the CCE aggregation level L used by the public DCI and the DCI of the UE is judged by the wideband CQI and RSRP information reported by the UE, and let Lcom be 4.

S104: The CCE is allocated according to the CCE aggregation level Lcom. According to the CCE aggregation level Lcom, the CCE resource allocable in the public CCE resource is $CCE_4$-$CCE_7$, $CCE_8$-$CCE_{11}$ and $CCE_{12}$-$CCE_{15}$, as shown in FIG. 2 (b).

If it is judged that there are multiple blocks of CCE resource allocable as for the used CCE aggregation level Lcom in the public CCE area, the following processing is carried out:

it is judged that the used CCE aggregation level Lcom is 4;

if multiple blocks of allocable CCE resource are in the public CCE, and there is the CCE resource of the head boundary CCE, this block of CCE resource is allocated to the public DCI; otherwise, the CCE resource is allocated according to the uniformity rule, so that the used CCE resource is distributed over the whole CCE resource as evenly as possible. There is no CCE resource of the head boundary CCE in the allocable CCE resource in FIG. 2(b), so the CCE resource $CCE_{12}$-$CCE_{15}$ is allocated to the public DCI according to the uniformity rule, as shown in FIG. 2(c). In this embodiment, the CCE can be directly allocated according to the uniformity rule no matter whether there is the head boundary CCE.

The flow is completed.

Second Example

The implementation process of allocating the CCE resource to the public DCI is described below by taking the example of determining the CCE aggregation level according to the mapping relationship between the CQI and PDCCH code rate. For the public DCI, the network side selects a proper PDCCH code rate for the corresponding public DCI at the current TTI according to the mapping relationship between the CQI and PDCCH code rate, then selects the needed CCE aggregation level Lcommin for the public DCI, and finally determines the CCE resource used by the public DCI by the CCE aggregation level and the use information of the CCE in the public CCE area.

Figure 3:
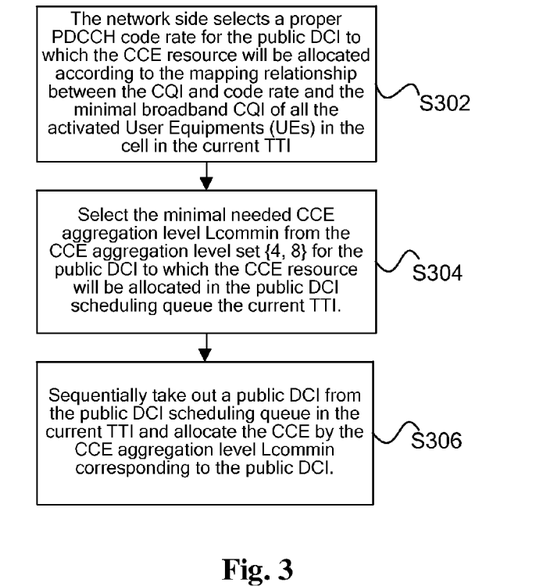
FIG. 3 is a flowchart of a method for allocating a CCE resource according to the second example of the embodiment of the present invention.

FIG. 3 is a flowchart of a method for allocating a CCE resource according to the second example of the embodiment of the present invention. As shown in FIG. 3, the method includes S302 to S306.

S302: The network side selects a proper PDCCH code rate for the public DCI according to the mapping relationship between the CQI and PDCCH code rate and the minimal wideband CQI of all the activated UEs in the cell at the current TTI, wherein the PDCCH code rate is the minimal PDCCH code rate needed by the minimal wideband CQI of all the activated UEs in the cell at the current TTI according to the mapping relationship between the CQI and PDCCH code rate.

S304: The network side selects the minimal needed CCE aggregation level Lcommin from the CCE aggregation level set {4, 8} for the public DCI at the current TTI according to the PDCCH code rate selected for the public DCI.

S306: For each public DCI, a public DCI is sequentially extracted from the public DCI scheduling queue at the current TTI to carry out the following processing: the CCE is allocated sequentially by the CCE aggregation level Lcommin corresponding to the public DCI.

The principle of allocating the CCE by the CCE aggregation level is: determining the CCE resource used by the public DCI by the CCE aggregation level and the use information of the CCE in the public CCE area.

The CCE resource is allocated to the public DCI under the following 3 conditions.

1) If there is no allocable CCE resource for the used CCE aggregation level Lcommin in the public CCE area, the CCE resource allocation for the public DCI is ended.

2) If there is only one block of allocable CCE resource for the used CCE aggregation level Lcommin in the public CCE area, such CCE resource is allocated to the public DCI.

3) If there are multiple blocks of allocable CCE resource for the used CCE aggregation level Lcommin in the public CCE area, the following processing is carried out:

Step 1: It is judged whether the used CCE aggregation level Lcommin is 4 or 8, and if it is 8, the boundary CCE resource $CCE_0$-$CCE_7$ is allocated to the public DCI, and the flow is ended; and if it is 4, Step 2 is executed.

Step 2: If there is the CCE resource of the head boundary CCE in the multiple blocks of allocable CCE resource in the public CCE area (that is, the allocable CCE resource contains the CCE resource $CCE_0$), this block of CCE resource is allocated to the public DCI; otherwise, the CCE resource is allocated according to the uniformity rule, in order that the used CCE resource are distributed over the whole CCE resource as evenly as possible.

Figure 4:
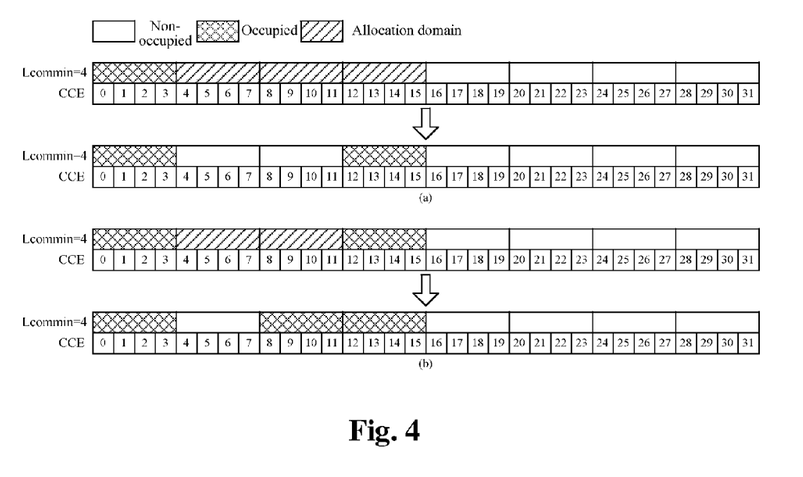
FIG. 4 is a diagram showing the allocation of a CCE resource to a public DCI according to the embodiment of the present invention.

For example, FIG. 4 is a diagram showing the allocation of a CCE resource to a public DCI according to the embodiment of the present invention. As shown in FIG. 4, in FIG. 4(a), the CCE aggregation level Lcommin used by a public DCI is 4. There are three blocks of allocable CCE resource in the current available public CCE areas: $CCE_4$-$CCE_7$, $CCE_8$-$CCE_{11}$, and $CCE_{12}$-$CCE_{15}$. According to the uniformity rule, $CCE_{12}$-$CCE_{15}$ is allocated to the public DCI.

As another example, in FIG. 4(b), the CCE aggregation level Lcommin used by a public DCI is 4. There are two blocks of allocable CCE resource in the current available public CCE area, $CCE_4$-$CCE_7$ and $CCE_8$-$CCE_{11}$ According to the uniformity rule, $CCE_8$-$CCE_{11}$ is allocated to the public DCI.

It should be noted that the allocation domain in FIG. 4 represents the CCE resource allocable in the public CCE area.

The processing is completed.

Third Example

Figure 5:
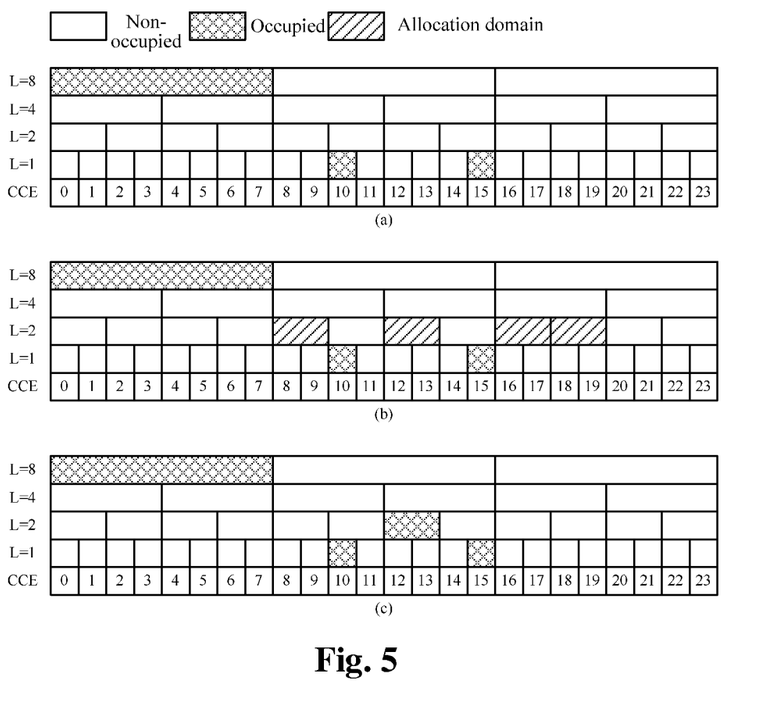
FIG. 5 is a diagram showing the allocation of a CCE resource according to the third example of embodiment of the present invention.
Figure 6:
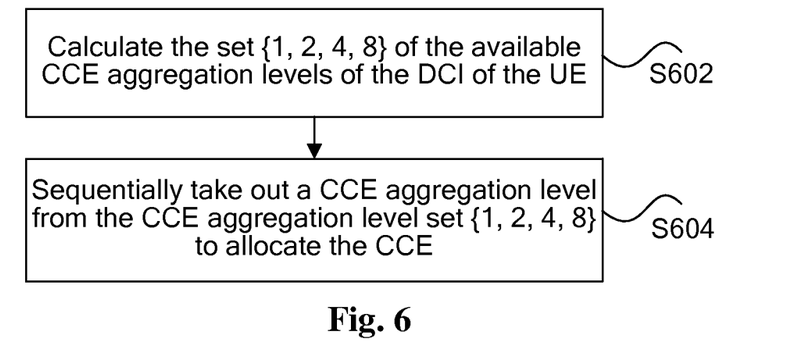
FIG. 6 is a flowchart of a method for allocating a CCE resource according to the third example of the embodiment of the present invention.

In a TTI, the CCE is allocated to the DCI of a UE. FIG. 5 is a diagram showing the allocation of a CCE resource according to the third example of the embodiment of the present invention. It is assumed that the CCE resource in the cell in the TTI is $CCE_0$-$CCE_{23}$, wherein the CCE resource $CCE_0$-$CCE_7$, $CCE_{10}$ and $CCE_{15}$ has been occupied, as shown in FIG. 5(a). Let the threshold B be 2. FIG. 6 is a flowchart of a method for allocating a CCE resource according to the third example of the embodiment of the present invention. As shown in FIG. 6, the method includes S602 to S604.

S602: The set of the CCE aggregation levels which can be used by the DCI of the UE is calculated by the conventional art, which is {1, 2, 4, 8}.

S604: A CCE aggregation level is sequentially extracted from the CCE aggregation level set {1, 2, 4, 8} for the CCE allocation, till the DCI of the UE is allocated with CCE resource or the CCE aggregation levels in the set {1, 2, 4, 8} are used up.

The CCE aggregation level of 1 is first used to allocate the CCE to the DCI of the UE. It is assumed that there is no allocable CCE resource for the CCE aggregation level of 1 used by the UE in the TTI, and it is judged that there is still available CCE aggregation level in the set of the CCE aggregation levels which can be used by the UE, and then the CCE aggregation level of 2 is used to allocate the CCE to the DCI of the UE.

It is assumed that the allocable CCE resource for the CCE aggregation level of 2 used by the UE in the TTI is respectively: $CCE_8$-$CCE_9$, $CCE_{12}$-$CCE_{13}$, $CCE_{16}$-$CCE_{17}$ and $CCE_{18}$-$CCE_{19}$.

It is judged that there are multiple blocks of allocable CCE resource in the PDCCH candidate area calculated by using CCE aggregation level of 2. As shown in FIG. 2, the number of PDCCH candidates corresponding to the CCE aggregation level of 2 is 6, and it is judged that the number of PDCCH candidates corresponding to the CCE aggregation level of 2 is greater than the threshold B, then the following processing is carried out:

the CCE is allocated by an aggregation uniformility method; that is, the following two aspects are taken into consideration: 1, evenness, i.e., the used CCE resource are distributed over the whole CCE resource as evenly as possible, and 2, aggregation, i.e., the used CCE resource occupies the CCE resource to be occupied by one or some CCE aggregation levels as fully as possible.

Generally, when there is a block of idle CCE resource having the same CCE aggregation level as that of this level, which can constitute the immediately higher CCE aggregation level by combining with the associated and occupied CCE resource, in the PDCCH candidate area, the second aspect is preferably considered. That is the aspect of aggregation. In other words, the idle CCE resource is preferably allocated. As shown in FIG. 5(b), the CCE resource $CCE_8$-$CCE_9$, and $CCE_{12}$-$CCE_{13}$ are respectively combined with CCE resource $CCE_{10}$-$CCE_{11}$ and $CCE_{14}$-$CCE_{15}$ to constitute the immediately higher CCE aggregation level (i.e., the aggregation level of 4). Therefore, the CCE resource $CCE_8$-$CCE_9$ and $CCE_{12}$-$CCE_{13}$ are preferred.

Furthermore, when there are multiple blocks of idle CCE resource having the same CCE aggregation level as that of this level, which can constitute the immediately higher CCE aggregation level by combining with the associated and occupied CCE resource, in the PDCCH candidate area, the idle CCE resource are further judged according to the uniformity rule. Therefore, the two blocks of idle CCE resource $CCE_8$-$CCE_9$ and $CCE_{12}$-$CCE_{13}$ are judged according to the uniformity rule, and the idle CCE resource $CCE_{12}$-$CCE_{13}$ is allocated to the DCI of the UE, as shown in FIG. 5(c).

The flow is completed.

Fourth Example

The implementation process of allocating the CCE resource to the DCI of the UE is described below by taking the example of determining the CCE aggregation level according to the mapping relationship between the CQI and PDCCH code rate. For the UE, the network side selects a proper PDCCH code rate for the DCI of the corresponding UE to which the CCE resource will be allocated at the current TTI, according to the mapping relationship between the CQI and the PDCCH code rate, and also selects the needed CCE aggregation level set $\{L_{uemin}, \ldots, 8\}$ for the DCI, and then determines the CCE resource used by the DCI of the UE according to the CCE aggregation level, the location of the PDCCH candidate area, the quantity of the CCE resource allocable in the PDCCH candidate area, the use condition of the CCE about the PDCCH area, and other information.

Figure 7:
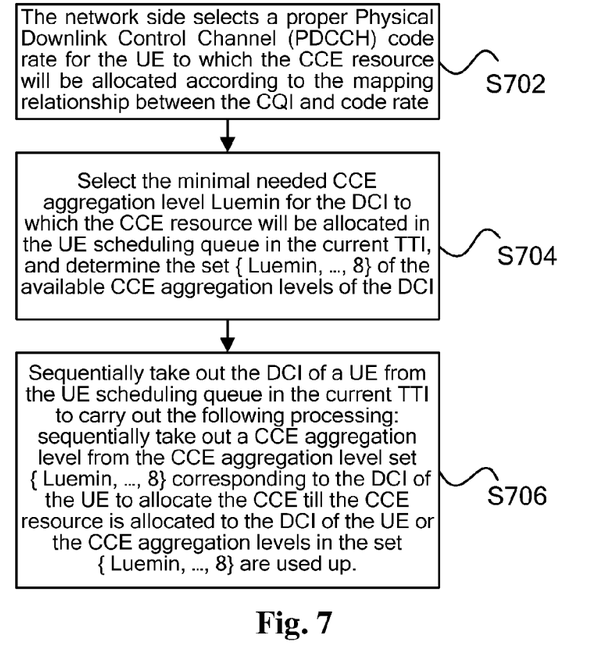
FIG. 7 is a flowchart of a method for allocating a CCE resource according to the fourth example of the embodiment of the present invention.

FIG. 7 is a flowchart of a method for allocating a CCE resource according to the fourth example of the embodiment of the present invention. As shown in FIG. 7, the method includes S702 to S706.

S702: The network side selects a proper PDCCH code rate for the corresponding UE according to the mapping relationship between the CQI and PDCCH code rate.

S704: The network side selects the minimal needed CCE aggregation level $L_{uemin}$ for the DCI of the UE to which the CCE resource will be allocated at the current TTI according to the PDCCH code rate selected for the UE, and determines that the CCE aggregation levels available to the DCI are all the values of the CCE aggregation levels greater than or equal to $L_{uemin}$, which are selected from the CCE aggregation level set $\{1, 2, 4, 8\}$, and constitute the set $\{L_{uemin}, \ldots, 8\}$.

S706: For the DCI of each UE, the DCI of one UE is sequentially extracted from the UE scheduling queue at the current TTI to carry out the following processing: one CCE aggregation level is sequentially extracted from the CCE aggregation level set $\{L_{uemin}, \ldots, 8\}$ corresponding to the DCI of the UE to allocate the CCE, till the DCI of the UE is allocated with CCE resource or the CCE aggregation levels in the set $\{L_{uemin}, \ldots, 8\}$ are used up.

The network side may be an Evolved NodeB (eNB).

The CCE resource is allocated to the DCI of the UE under the following 3 conditions.

1) If there is no allocable CCE resource in the PDCCH candidate area calculated according to the used CCE aggregation level L, it is judged whether there are some CCE aggregation levels remained unused in the set $\{L_{uemin}, \ldots, 8\}$, and if yes, the CCE resource is allocated by sequentially using these CCE aggregation levels; and if not, the allocation of the CCE resource to the DCI is ended.

2) If there is only one block of allocable CCE resource in the PDCCH candidate area calculated according to the used CCE aggregation level L, this block of CCE resource is allocated to the DCI of the UE.

3) If there are multiple blocks of allocable CCE resource in the PDCCH candidate area calculated according to the used CCE aggregation level L, the following processing is carried out:

Step 1: It is judged whether the number of PDCCH candidates is greater than the threshold B; and if it is less than or equal to the threshold B, Step 2 is executed; and if it is greater than the threshold B, Step 3 is executed. Generally, the threshold B is 2.

Step 2: The CCE is allocated according to the uniformity rule, in order that the used CCEs are distributed over the whole CCE resource as evenly as possible.

Figure 8:
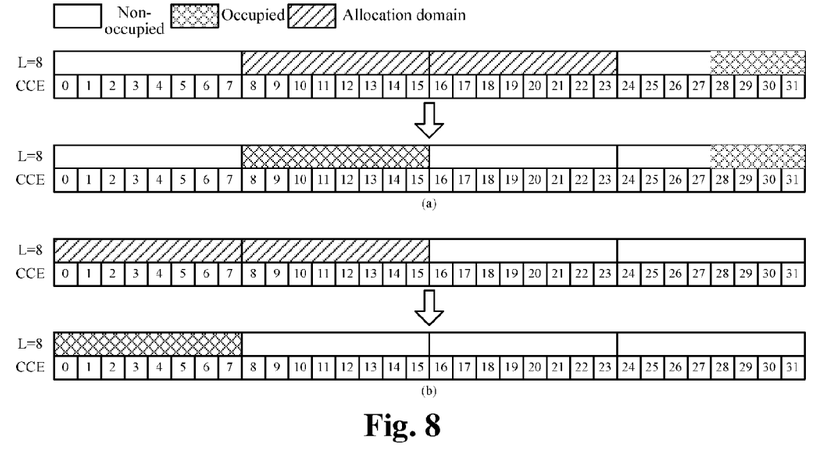
FIG. 8 is a diagram showing the allocation of a CCE resource with the CCE aggregation level of 8 to the DCI of a UE according to the embodiment of the present invention.

For example, if the CCE resource, in which the CCE aggregation level is 8 and the corresponding number of PDCCH candidates is 2, is not occupied, it is judged whether the CCE resource of the same CCE aggregation level L at the two ends connected (combined) with the PDCCH candidate area is occupied (completely or partially occupied). If the CCE resource at one end is occupied and the CCE resource at the other is not, the CCE resource adjacent to the non-occupied end is allocated to the DCI of the UE. FIG. 8 is a diagram showing the allocation of a CCE resource with the CCE aggregation level of 8 to the DCI of a UE according to the embodiment of the present invention. As shown in FIG. 8(a), a UE uses the CCE aggregation level L of 8 to allocate the CCE to the DCI thereof. In the PDCCH candidate area $CCE_8$-$CCE_{23}$, there are two allocable blocks of CCE resource: $CCE_8$-$CCE_{15}$ and $CCE_{16}$-$CCE_{23}$, and meanwhile the CCE resource $CCE_{23}$-$CCE_{31}$ adjacent to the CCE resource $CCE_{16}$-$CCE_{23}$ is occupied. Therefore, the CCE resource $CCE_8$-$CCE_{15}$ is allocated to the DCI of the UE.

As another example, if the CCE resource at the two ends is not occupied, then it is further judged whether the CCE resource of the same CCE aggregation level L at the two ends secondarily connected with the PDCCH candidate area is occupied. If the CCE resource at one end is occupied and the CCE resource at the other is not, the CCE resource adjacent to the non-occupied end is allocated to the DCI of the UE. The judgment is carried out repeatedly by the above method till a judgment result is obtained.

As another example, if the CCE resource at the two ends is occupied, it is further judged whether the CCE resource of the same CCE aggregation level L at the two ends secondarily connected with the PDCCH candidate area is occupied. If the CCE resource at one end is occupied and the CCE resource at the other is not, the block of CCE resource adjacent to the non-occupied end is allocated to the DCI of the UE. The judgment is carried out repeatedly by the above method till a judgment result is obtained.

It should be noted that if there are boundary CCE resource, the idle boundary CCE resource are preferably allocated. As shown in FIG. 8(b), a UE uses the CCE aggregation level L of 8 to allocate a CCE to the DCI thereof. In the PDCCH candidate area $CCE_8$-$CCE_{23}$, there are two blocks of allocable CCE resource: $CCE_0$-$CCE_7$ and $CCE_8$-$CCE_{15}$, and meanwhile, the CCE resource $CCE_0$-$CCE_7$ is the boundary CCE resource. Therefore, the CCE resource $CCE_0$-$CCE_7$ is allocated to the DCI of the UE.

It should be noted that the allocation domain in FIG. 8 represents the allocable CCE resource in the PDCCH candidate area calculated according to the used CCE aggregation level L.

Step 3: The CCE is allocated by an aggregation uniformity method. That is, the following two aspects are taken into consideration: 1, evenness, i.e., the used CCE resource are distributed over the whole CCE resource as evenly as possible; and 2, aggregation, i.e., the used CCE resource occupies the CCE resource to be occupied by one or some CCE aggregation levels as fully as possible.

Figure 9:
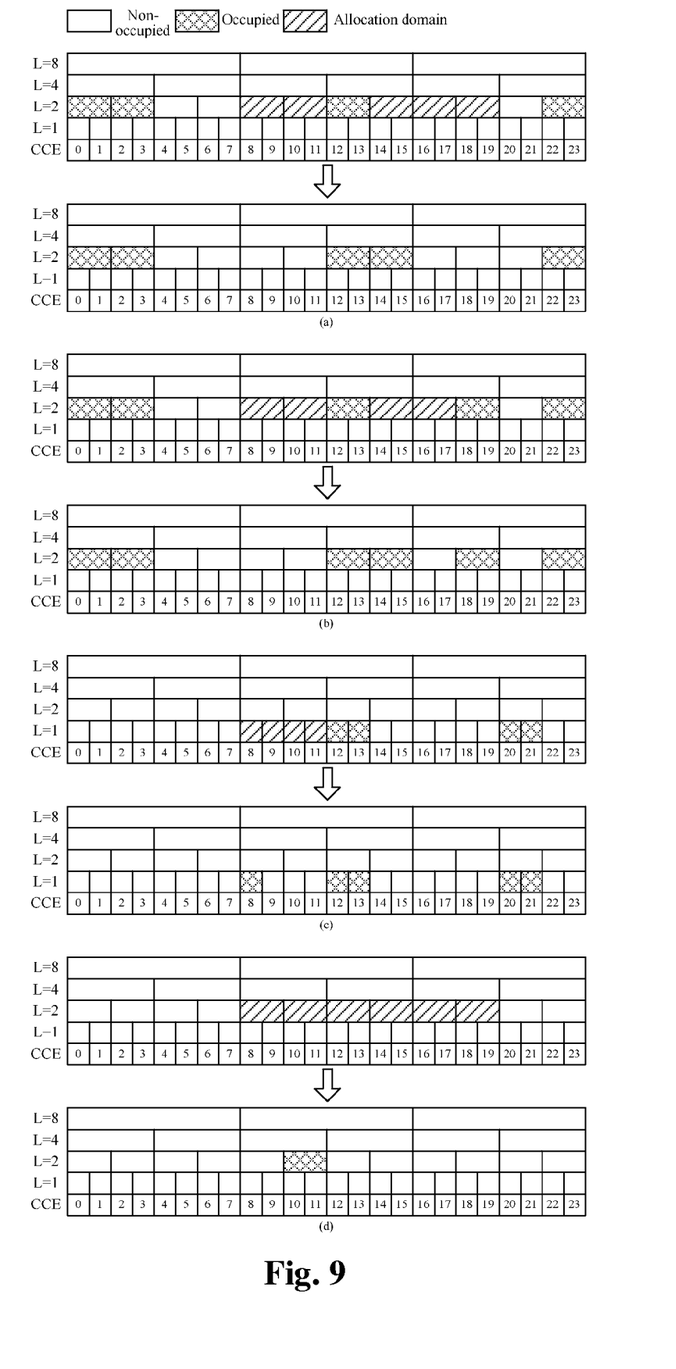
FIG. 9 is a diagram showing the allocation of a CCE resource with the CCE aggregation level of 1 and 2 to the DCI of a UE according to the embodiment of the present invention.

Generally, when there is a block of idle CCE resource having the same CCE aggregation level as that of this level, which can constitute the immediately higher CCE aggregation level by combining with the connected occupied CCE resource (partially or completely occupied), in the PDCCH candidate area, the second aspect, i.e. aggregation, is preferably considered. In other words, the idle CCE resource is preferably allocated. FIG. 9 is a diagram showing the allocation of a CCE resource with the CCE aggregation levels of 1 and 2 to the DCI of a UE according to the embodiment of the present invention, as shown in FIG. 9(a).

Furthermore, when there are multiple blocks of idle CCE resource having the same CCE aggregation level as that of this level, which can constitute the immediately higher CCE aggregation level by combining with the connected occupied CCE resource (partially or completely occupied), in the PDCCH candidate area, the idle CCE resource is further judged according to the uniformity rule, as shown in FIG. 9(b).

Furthermore, when there is no idle CCE resource having the same CCE aggregation level as that of this level, which can constitute the immediately higher CCE aggregation level by combining with the connected occupied CCE resource (partially or completely occupied), in the PDCCH candidate area, the idle CCE resource in the PDCCH candidate area is judged according to the uniformity rule, as shown in FIG. 9(c).

Furthermore, when it is judged that there are multiple blocks of idle CCE resource in the PDCCH candidate area according to the uniformity rule, any one block of the idle CCE resource is allocated. As shown in FIG. 9(d), any of $CCE_{10}$-$CCE_{11}$ and $CCE_{12}$-$CCE_{13}$ may be allocated according to the uniformity rule, and $CCE_{10}$-$CCE_{11}$ is allocated in FIG. 9(d).

It should be noted that the allocation domain in FIG. 9 represents the allocable CCE resource in the PDCCH candidate area calculated according to the used CCE aggregation level L.

The processing is completed.

Figure 10:
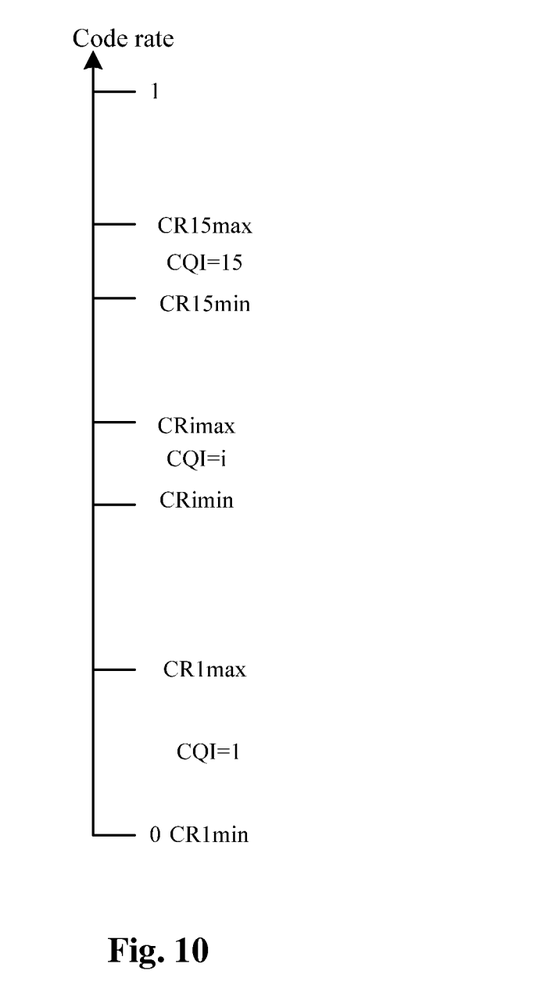
FIG. 10 is a diagram showing the mapping relationship between the CQI and PDCCH code rate according to the embodiment of the present invention.

The mapping relationship between the CQI and PDCCH code rate is the range of the allowable PDCCH code rates of the corresponding downlink CQI when the error rate of the PDCCH is less than or equal to the error rate threshold A. Generally, the error rate threshold A of the PDCCH is 1%. FIG. 10 is a diagram showing the mapping relationship between the CQI and PDCCH code rate according to the embodiment of the present invention. As shown in FIG. 10, the vertical coordinate represents the code rate of the PDCCH, each CQI value corresponds to a code rate section. For instance, the CQI being 1 corresponds to the code rate [CR1 min, CR1 max), the CQI being i corresponds to the code rate (CR) [CRimin, CRimax), and the CQI being 15 corresponds to the code rate [CR15 min, CR15 max).

In a certain bandwidth configuration (which is a cell downlink bandwidth for a Frequency Division Duplex (FDD) mode, and a cell bandwidth for a Time Division Duplex (TDD) mode), for a DCI, there are different PDCCH code rates in the different CCE aggregation levels, and the greater the CCE aggregation level is, the less the code rate is.

Device Embodiment

According to the embodiment of the present invention, a device for allocating a CCE resource is provided, including: an allocation module which is used for allocating the CCE resource according to the CCE aggregation level and the current use information of the CCE resource.

In the embodiment, besides the CCE aggregation level, the current use information of the CCE resource is introduced for the allocation of the CCE resource, so as to allocate the idle CCE resource to the DCI needing the CCE resource when there is idle CCE resource, thereby avoiding resource waste and achieving the effect of effectively utilizing the idle CCE resource.

Figure 11:
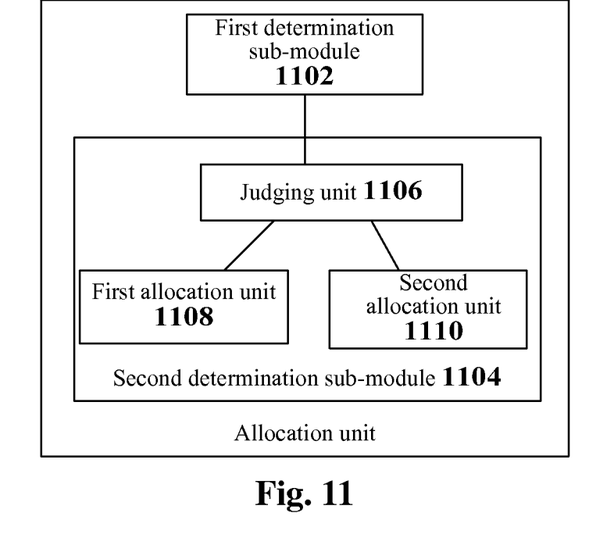
FIG. 11 is a block diagram showing the specific structure of a device for allocating a CCE resource according to the embodiment of the present invention.

FIG. 11 is a block diagram showing the specific structure of a device for allocating a CCE resource according to the embodiment of the present invention. As shown in FIG. 11, the allocation module includes: a first determination sub-module 1102, and a second determination sub-module 1104, which are described below in detail.

The first determination sub-module 1102 is used for determining the CCE resource to be selected by the public DCI according to the CCE aggregation level corresponding to the public DCI, and the second determination sub-module 1104 is connected to the first determination sub-module 1102 and used for determining a block of CCE resource from the CCE resource to be selected by the public DCI to allocate to the public DCI according to the current use information of the CCE resource.

In this embodiment, the range of the CCE resource to be selected by the public DCI is determined by the CCE aggregation level, and then the CCE resource allocated to the public DCI is determined by the current use information of the CCE resource, so that the idle CCE resource can be effectively allocated to the public DCI.

The second determination sub-module 1104 can include: a judging unit 106, a first allocation unit 1108, and a second allocation unit 1110, which are described below in detail.

The judging unit 1106 is used for judging whether some of the CCE resource to be selected by the public DCI is located in the boundary CCE; the first allocation unit 1108 is connected to the judging unit 1106 and used for allocating the CCE resource in the boundary CCE to the DCI, if the judging result of the judging unit is yes; and the second allocation unit 1110 is connected to the judging unit 1106 and used for determining a block of CCE resource from the CCE resource to be selected by the public DCI according to the uniformity rule to allocate it to the DCI, if the judging result of the judging unit is no.

In the embodiment, if there is an idle boundary CCE, the boundary CCE is allocated to the public DCI; and if there is no idle boundary CCE, the CCE is allocated to the public DCI according to the uniformity rule, so that the CCE resource allocated to the DCI can be evenly distributed over the whole CCE area.

The second determination sub-module 1104 may be used for determining a block of CCE resource from the CCE resource to be selected by the public DCI to allocate it to the DCI according to the uniformity rule.

In this embodiment, the CCE is allocated to the public DCI according to the uniformity rule, so that the CCE resource allocated to the DCI can be evenly distributed over the whole CCE area.

Figure 12:
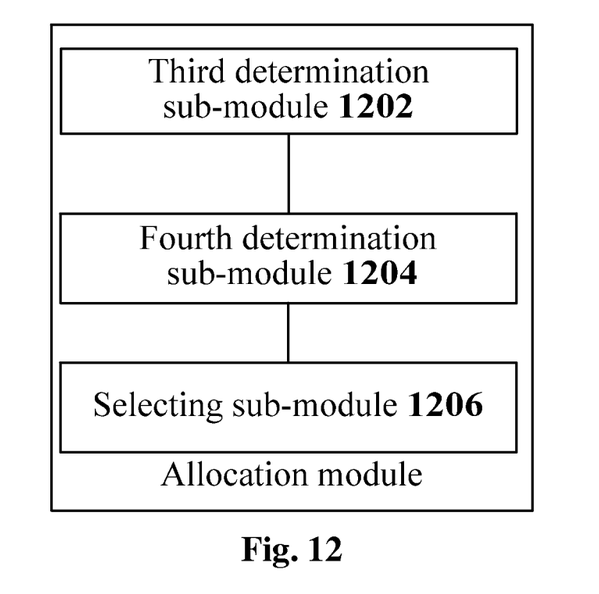
FIG. 12 is a block diagram showing another specific structure of a device for allocating a CCE resource according to the embodiment of the present invention.

FIG. 12 is a block diagram showing another specific structure of a device for allocating a CCE resource according to the embodiments of the present invention. As shown in FIG. 12, the allocation module includes: a third determination sub-module 1202, and a fourth determination sub-module 1204, which are described below in detail.

The third determination sub-module 1202 is used for determining the CCE resource to be selected by the DCI of the UE according to the CCE aggregation level corresponding to the DCI of the UE; and the fourth determination sub-module 1204 is connected to the third determination sub-module 1202 and used for determining a block of CCE resource from the CCE resource to be selected by the DCI of the UE to allocate to the DCI of the UE according to the uniformity rule.

In this embodiment, the range of the CCE resource to be selected by the DCI of the UE is determined by the CCE aggregation level, and then the CCE resource allocated to the DCI of the UE is determined by the current use information of the CCE resource, so that the idle CCE resource can be effectively allocated to the DCI of the UE.

When the fourth determination sub-module 1204 determines that multiple blocks of CCE resource are allocated to the DCI of the UE, the allocation module further includes: a selecting sub-module 1206 which is used for selecting a block of CCE resource which fully occupies a CCE aggregation level greater than the current CCE aggregation level from the multiple blocks of CCE resource to allocate to the DCI of the UE.

In this embodiment, the CCE is allocated to the DCI of the UE according to the uniformity rule, so that the CCE resource allocated to the DCI can be evenly allocated in the whole CCE area.

It should be noted that the devices for allocating the CCE resource described in the device embodiment correspond to the method embodiments. The specific implementation is described in detail in the method embodiments, thereby repeated description is omitted here.

To sum up, through the present invention, the utilization rate of the CCE resource is improved.

It should be noted that the steps shown in the flowchart of the drawings can be executed, for example, in the computer system of a set of computer executable instructions. In addition, a logic order is shown in the flowchart, but the shown or described steps can be executed in a different order under some conditions.

Obviously, those skilled in the art shall understand that each module or step of the present invention may be implemented by general computing devices and centralized in a single computing device or allocated in a network consisting of multiple computing devices. Optionally, the modules or steps may be implemented by program codes executable by the computing devices, so that they may be stored in a storage device to be executed by the computing device, or respectively made into integrated circuit modules or a single integrated circuit module. By doing so, the present invention is not limited to any specific combination of hardware and software.

The above are only preferred embodiments of the present invention and should not be used for limiting the present invention. For those skilled in the art, the present invention may have various modifications and changes. Any modifications, equivalent replacements, improvements and the like within the spirit and principle of the present invention shall fall within the scope of protection of the present invention.

What is claimed is:

1. A method for allocating a Control Channel Element (CCE) resource, comprising:
    allocating, by a network side, the CCE resource according to a CCE aggregation level and current use information of the CCE resource,
    wherein the step of allocating by the network side the CCE resource according to the CCE aggregation level and the current use information of the CCE resource comprises:
    determining, by the network side, the CCE resource to be selected by public Downlink Control Information (DCI) according to the CCE aggregation level corresponding to the public DCI; and
    determining, by the network side, a block of CCE resource from the CCE resource to be selected by the public DCI, to allocate to the public DCI according to the current use information of the CCE resource,
    wherein the step of determining by the network side a block of CCE resource from the CCE resource to be selected by the public DCI to allocate to the public DCI according to the current use information of the CCE resource comprises:
    judging, by the network side, whether some of the CCE resource to be selected by the public DCI is located in a boundary CCE;
    if yes, allocating the CCE resource in the boundary CCE to the public DCI by the network side; and
    if not, determining, by the network side, a block of CCE resource from the CCE resource to be selected by the public DCI to allocate to the public DCI according to an uniformity rule.

2. The method according to claim 1, wherein the step of determining by the network side a block of CCE resource from the CCE resource to be selected by the public DCI to allocate to the public DCI according to the current use information of the CCE resource comprises:
    determining, by the network side, a block of CCE resource from the CCE resource to be selected by the public DCI to allocate to the public DCI according to an uniformity rule.

3. The method according to claim 1, wherein the step of allocating by a network side the CCE resource according to a CCE aggregation level and current use information of the CCE resource comprises:
    determining, by the network side, the CCE resource to be selected by a DCI of a User Equipment (UE) according to a CCE aggregation level corresponding to the DCI of the UE; and
    determining, by the network side, a block of CCE resource from the CCE resource to be selected by the DCI of the UE to allocate to the DCI of the UE according to an uniformity rule.

4. The method according to claim 3, wherein when determining, by the network side, multiple blocks of CCE resource from the CCE resource to be selected by the DCI of the UE to allocate to the DCI of the UE according to the uniformity rule, the method further comprises:
    selecting, by the network side, a block of CCE resource which fully occupies CCE aggregation levels greater than a current CCE aggregation level from the multiple blocks of CCE resource to allocate to the DCI of the UE.

5. The method according to claim 4, wherein the step of selecting by the network side the block of CCE resource which fully occupies the CCE aggregation levels greater than the current CCE aggregation level from the multiple blocks of CCE resource to allocate to the DCI of the UE comprises:
    Step 1, selecting, by the network side, a CCE aggregation level from the CCE aggregation levels greater than the current CCE aggregation level in an ascending order; and
    Step 2, judging, by the network side, whether there are more than one block of CCE resource fully occupying the selected CCE aggregation level in the multiple blocks of CCE resource, and if not, allocating the block of CCE resource to the DCI of the UE, otherwise, executing Step 1.

6. The method according to claim 4, wherein before determining, by the network side, a block of CCE resource from the CCE resource to be selected by the DCI of the UE to allocate to the DCI of the UE according to an uniformity rule, the method further comprises:
    judging that the number of PDCCH candidates corresponding to the corresponding CCE aggregation level is greater than a predetermined threshold.

7. The method according to claim 5, wherein before determining, by the network side, a block of CCE resource from the CCE resource to be selected by the DCI of the UE to allocate to the DCI of the UE according to an uniformity rule, the method further comprises:

judging that the number of PDCCH candidates corresponding to the corresponding CCE aggregation level is greater than a predetermined threshold.

8. A device for allocating a CCE resource, comprising:

an allocation module, configured to allocate the CCE resource according to a CCE aggregation level and current use information of the CCE resource, wherein the allocation module further includes:

a first determination sub-module, configured to determine a CCE resource to be selected by a public DCI according to a CCE aggregation level corresponding to the public DCI, and a second determination sub-module, configured to determine a block of CCE resource from one or more block(s) of CCE resource to be selected by the public DCI to allocate to the public DCI according to the current use information of the CCE resource, wherein the second determination sub-module comprises:

a judging unit, configured to judge whether some of the CCE resource to be selected by the public DCI is located in the boundary CCE;

a first allocation unit, configured to allocate the CCE resource in the boundary CCE to the public DCI, if the judging result of the judging unit is yes; and a second allocation unit, configured to determine a block of CCE resource from the CCE resource to be selected by the public DCI to allocate to the public DCI according to the uniformity rule, if the judging result of the judging unit is no.

9. The device according to claim 8, wherein the second determination sub-module is configured to determine a block of CCE resource from the CCE resource to be selected by the public DCI to allocate to the public DCI according to an uniformity rule.

10. The device according to claim 8, wherein the allocation module comprises:

a third determination sub-module, configured to determine the CCE resource to be selected by the DCI of the UE according to the CCE aggregation level corresponding to the DCI of the UE, and a fourth determination sub-module, configured to determine a block of CCE resource from the CCE resource to be selected by the DCI of the UE to allocate to the DCI of the UE according to an uniformity rule.

11. The device according to claim 10, wherein when the fourth determination sub-module determines that multiple blocks of CCE resource are allocated to the DCI of the UE, the device further comprises:

a selecting sub-module, configured to select a block of CCE resource which fully occupies CCE aggregation levels greater than the current CCE aggregation level from the multiple blocks of CCE resource to allocate to the DCI of the UE.

* * * * *